US010598379B2

(12) United States Patent
Cunha et al.

(10) Patent No.: US 10,598,379 B2
(45) Date of Patent: Mar. 24, 2020

(54) FILM COOLED MULTI-WALLED STRUCTURE WITH ONE OR MORE INDENTATIONS

(71) Applicant: United Technologies Corporation, Farmington, CT (US)

(72) Inventors: Frank J. Cunha, Avon, CT (US); Stanislav Kostka, Jr., Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 487 days.

(21) Appl. No.: 15/034,689

(22) PCT Filed: Nov. 25, 2014

(86) PCT No.: PCT/US2014/067299
§ 371 (c)(1),
(2) Date: May 5, 2016

(87) PCT Pub. No.: WO2015/077755
PCT Pub. Date: May 28, 2015

(65) Prior Publication Data
US 2016/0273771 A1 Sep. 22, 2016

Related U.S. Application Data

(60) Provisional application No. 61/908,513, filed on Nov. 25, 2013.

(51) Int. Cl.
*F23R 3/00* (2006.01)
*F01D 25/12* (2006.01)
(Continued)

(52) U.S. Cl.
CPC ............ *F23R 3/002* (2013.01); *F01D 5/188* (2013.01); *F01D 25/12* (2013.01); *F02C 7/18* (2013.01);
(Continued)

(58) Field of Classification Search
CPC .............. F23R 2900/03042; F23R 3/002; F23R 3/005; F05D 2260/2212; F05D 2250/712;
(Continued)

(56) References Cited

U.S. PATENT DOCUMENTS 4,265,085 A 5/1981 Fox et al.
4,529,358 A * 7/1985 Papell ................ F01D 5/186
415/115

(Continued)

FOREIGN PATENT DOCUMENTS

CA 2965370 A1 * 6/2016 ............ F01D 5/188

OTHER PUBLICATIONS

EP search report for EP14864601.1 dated Nov. 4, 2016.

*Primary Examiner* — J. Todd Newton
(74) *Attorney, Agent, or Firm* — Getz Balich LLC (57) ABSTRACT

An assembly for a turbine engine is provided. This turbine engine assembly includes a shell and a heat shield with a cooling cavity between the shell and the heat shield. The heat shield defines a plurality of cooling apertures and an indentation in a side of the heat shield opposite the cooling cavity. The cooling apertures are fluidly coupled with the cooling cavity. The indentation is configured such that cooling air, directed from a first of the cooling apertures, at least partially circulates against the side of the heat shield.

19 Claims, 13 Drawing Sheets

(51) Int. Cl.
*F02C 7/24* (2006.01)
*F02C 7/18* (2006.01)
*F01D 9/02* (2006.01)
*F01D 5/18* (2006.01)

(52) U.S. Cl.
CPC ............... *F02C 7/24* (2013.01); *F23R 3/005* (2013.01); *F01D 9/023* (2013.01); *F05D 2250/21* (2013.01); *F05D 2250/23* (2013.01); *F05D 2250/232* (2013.01); *F05D 2250/24* (2013.01); *F05D 2250/241* (2013.01); *F05D 2250/324* (2013.01); *F05D 2250/712* (2013.01); *F05D 2260/201* (2013.01); *F05D 2260/202* (2013.01); *F05D 2260/2212* (2013.01); *F05D 2260/2214* (2013.01); *F23R 2900/03042* (2013.01)

(58) Field of Classification Search
CPC ........... F05D 2250/324; F05D 2250/21; F05D 2260/202; F05D 2260/201; F05D 2260/2214; F05D 2250/232; F05D 2250/23; F05D 2250/24; F05D 2250/241; F02C 7/24; F02C 7/18; F01D 5/188; F01D 25/12; F01D 9/023; F01D 5/18
USPC ............... 60/752; 219/121.71, 121.72, 121.8
See application file for complete search history.

(56) References Cited

U.S. PATENT DOCUMENTS

| | | | | |
|---|---|---|---|---|
| 4,773,593 A * | 9/1988 | Auxier | F01D 5/184 | 239/127.3 |
| 4,901,522 A | 2/1990 | Commaret et al. | | |
| 5,265,409 A * | 11/1993 | Smith, Jr. | F02C 7/105 | 29/888.012 |
| 5,435,139 A | 7/1995 | Pidcock et al. | | |
| 5,461,866 A | 10/1995 | Sullivan et al. | | |
| 5,483,794 A | 1/1996 | Nicoll et al. | | |
| 5,609,779 A * | 3/1997 | Crow | B23K 26/0622 | 219/121.71 |
| 5,758,503 A | 6/1998 | DuBell et al. | | |
| 6,237,344 B1 * | 5/2001 | Lee | F01D 5/186 | 165/908 |
| 6,307,175 B1 * | 10/2001 | Blochlinger | B23K 26/388 | 219/121.71 |
| 6,547,524 B2 | 4/2003 | Kohli | F01D 5/141 | 415/115 |
| 7,093,441 B2 | 8/2006 | Burd et al. | | |
| 7,146,815 B2 | 12/2006 | Burd | | |
| 7,186,085 B2 * | 3/2007 | Lee | F01D 5/186 | 416/97 R |
| 7,820,267 B2 * | 10/2010 | Fahndrich | F01D 5/186 | 219/121.7 |
| 8,066,478 B1 * | 11/2011 | Shih | F01D 5/186 | 415/115 |
| 8,443,610 B2 | 5/2013 | Hoke et al. | | |
| 8,522,558 B1 * | 9/2013 | Xu | F01D 5/186 | 415/115 |
| 8,572,983 B2 * | 11/2013 | Xu | F01D 5/186 | 60/752 |
| 8,584,470 B2 * | 11/2013 | Zelesky | F01D 5/186 | 415/115 |
| 8,608,443 B2 * | 12/2013 | Lee | F01D 5/186 | 415/115 |
| 8,628,293 B2 * | 1/2014 | Ramachandran | F01D 5/186 | 415/115 |
| 8,683,813 B2 * | 4/2014 | Xu | F01D 5/186 | 415/115 |
| 8,683,814 B2 * | 4/2014 | Xu | F01D 5/186 | 415/115 |
| 8,733,111 B2 * | 5/2014 | Gleiner | F23R 3/06 | 415/115 |
| 8,763,402 B2 * | 7/2014 | Xu | F01D 5/186 | 60/752 |
| 8,850,828 B2 * | 10/2014 | Mongillo, Jr. | F01D 5/186 | 60/806 |
| 9,181,819 B2 * | 11/2015 | Lee | F01D 5/18 | |
| 9,234,438 B2 * | 1/2016 | Lee | F01D 25/12 | |
| 9,273,560 B2 * | 3/2016 | Gleiner | F01D 5/187 | |
| 9,410,435 B2 * | 8/2016 | Xu | F01D 5/186 | |
| 9,410,702 B2 * | 8/2016 | Dudebout | F23R 3/16 | |
| 9,416,665 B2 * | 8/2016 | Xu | F01D 5/186 | |
| 9,416,971 B2 * | 8/2016 | Xu | F23R 3/06 | |
| 9,422,815 B2 * | 8/2016 | Xu | F01D 5/186 | |
| 9,482,100 B2 * | 11/2016 | Kohli | F01D 5/18 | |
| 9,598,979 B2 * | 3/2017 | Reed | F01D 25/12 | |
| 9,759,069 B2 * | 9/2017 | Nita | F01D 5/186 | |
| 10,024,169 B2 * | 7/2018 | Bunker | F01D 5/186 | |
| 10,184,663 B2 * | 1/2019 | Frish | F23R 3/283 | |
| 2002/0172596 A1 * | 11/2002 | Kohli | F01D 5/141 | 416/1 |
| 2004/0265488 A1 * | 12/2004 | Hardwicke | C23C 26/02 | 427/180 |
| 2005/0081526 A1 * | 4/2005 | Howell | F23R 3/002 | 60/748 |
| 2007/0014631 A1 * | 1/2007 | Wagner | F01D 5/066 | 403/408.1 |
| 2008/0264065 A1 * | 10/2008 | Gerendas | F23R 3/002 | 60/754 |
| 2009/0077974 A1 | 3/2009 | Dahlke et al. | | |
| 2010/0287941 A1 | 11/2010 | Kim et al. | | |
| 2011/0185735 A1 | 8/2011 | Snyder | | |
| 2011/0311369 A1 | 12/2011 | Ramachandran et al. | | |
| 2012/0102959 A1 * | 5/2012 | Starkweather | F23R 3/04 | 60/752 |
| 2012/0324897 A1 * | 12/2012 | McMahan | F01D 9/023 | 60/752 |
| 2013/0025288 A1 * | 1/2013 | Cunha | F23R 3/002 | 60/772 |
| 2013/0160457 A1 * | 6/2013 | de Bock | F23R 3/002 | 60/779 |
| 2013/0209233 A1 * | 8/2013 | Xu | F01D 5/186 | 415/116 |
| 2013/0323080 A1 * | 12/2013 | Martin | F01D 5/186 | 416/97 R |
| 2015/0323182 A1 * | 11/2015 | Sandoval | F23R 3/02 | 60/752 |
| 2016/0061451 A1 * | 3/2016 | Dudebout | F23R 3/06 | 60/806 |
| 2016/0097285 A1 * | 4/2016 | Harding | F01D 5/186 | 60/752 |
| 2016/0097325 A1 * | 4/2016 | Harding | F01D 5/186 | 60/752 |
| 2016/0123156 A1 * | 5/2016 | Hucker | F01D 5/186 | 60/806 |
| 2016/0201511 A1 * | 7/2016 | Chang, Jr. | F01D 25/24 | 415/1 |
| 2016/0251967 A1 * | 9/2016 | Bunker | F01D 5/186 | 416/95 |
| 2016/0273771 A1 * | 9/2016 | Cunha | F01D 5/188 | |
| 2016/0281511 A1 * | 9/2016 | Hille | F01D 5/005 | |
| 2017/0234537 A1 * | 8/2017 | Bunker | F02C 3/04 | 60/754 |

* cited by examiner

FIG. 22

FILM COOLED MULTI-WALLED STRUCTURE WITH ONE OR MORE INDENTATIONS

This application claims priority to PCT Patent Application No. PCT/US14/067299 filed Nov. 25, 2014 which claims priority to U.S. Patent Application No. 61/908,513 filed Nov. 25, 2013, which are hereby incorporated herein by reference in their entireties.

BACKGROUND OF THE INVENTION

1. Technical Field

This disclosure relates generally to a film cooled multi-walled structure of a turbine engine.

2. Background Information

A floating wall combustor for a turbine engine typically includes a bulkhead that extends radially between inner and outer combustor walls. Each of the combustor walls includes a shell and a heat shield, where the heat shields define opposed radial sides of a combustion chamber. Cooling cavities are defined radially between the heat shield and the shell. These cooling cavities fluidly couple impingement apertures defined in the shell with effusion apertures defined in the heat shield.

During turbine engine operation, the impingement apertures direct cooling air into the cooling cavities to impinge against the heat shield. The effusion apertures subsequently direct the cooling air into the combustion chamber to film cool the heat shield. The cooling air flowing out of each effusion aperture, for example, may form a film that generally flows against a downstream portion of the heat shield to provide film cooling. However, turbulent core air within the combustion chamber may cause the film to detach from the heat shield after only traveling a relatively small distance and mix with the core air. As a result, some portions of the heat shield may receive limited film cooling.

There is a need in the art for an improved film cooled multi-walled structure such as a turbine engine combustor wall.

SUMMARY OF THE DISCLOSURE

According to an aspect of the invention, an assembly is provided for a turbine engine. This turbine engine assembly includes a shell and a heat shield with a cooling cavity between the shell and the heat shield. The heat shield defines a plurality of cooling apertures and an indentation in a side of the heat shield opposite the cooling cavity. The cooling apertures are fluidly coupled with the cooling cavity. The indentation is configured such that cooling air, directed from a first of the cooling apertures, at least partially circulates against the side of the heat shield.

According to another aspect of the invention, another assembly is provided for a turbine engine. This turbine engine assembly includes a shell and a heat shield attached to the shell with a cooling cavity extending between the heat shield and the shell. The heat shield defines a plurality of cooling apertures and an indentation in a side of the heat shield opposite the cooling cavity. The cooling apertures are fluidly coupled with the cooling cavity. An outlet of a first of the cooling apertures is located at an edge of the indentation.

The indentation may be configured such that cooling air, directed from the outlet, at least partially circulates against the side of the heat shield; e.g., within the indentation.

The shell may define a plurality of cooling apertures that are fluidly coupled with the cooling apertures in the heat shield by the cooling cavity.

The heat shield includes a first surface and a second surface with the first surface defining an outlet of the first of the cooling apertures and the second surface defining the indentation. The first and the second surface may be adjacent and contiguous with one another. Alternatively, the first surface may be separated from the second surface by a distance. The outlet of the first of the cooling apertures may also or alternatively intersect with the indentation.

An outlet of the first of the cooling apertures may be separated from the indentation by a distance.

The first of the cooling apertures may be circumferentially or otherwise (e.g., axially) aligned with the indentation. Alternatively, the first of the cooling apertures may be circumferentially or otherwise (e.g., axially) offset from the indentation.

A surface that defines the indentation may have a circular peripheral geometry. Alternatively, the surface may have an oval peripheral geometry. Alternatively, the surface may have a peripheral geometry with one or more concave sections and one or more convex sections; e.g., a pear-shaped peripheral geometry. Still alternatively, an annular surface of the heat shield may define the indentation.

A second of the cooling apertures may be configured to direct cooling air away from the cooling cavity. The indentation may be configured such that cooling air, directed from the second cooling aperture, at least partially circulates against the side of the heat shield; e.g., within the indentation.

The heat shield may define a second indentation in the side of the heat shield. This second indentation may be configured such that cooling air, directed from a second of the cooling apertures, at least partially circulates against the side of the heat shield; e.g., within the second indentation.

The heat shield may include an arcuate panel in which the first of the cooling apertures and the indentation are defined.

The turbine engine assembly may include a tubular combustor wall that includes the shell and the heat shield.

The heat shield may extend vertically between a chamber surface and a cavity surface that defines a portion of the cooling cavity. A point (e.g., a low point) of an indentation surface, which defines the indentation, may be located a vertical distance from the cavity surface. The vertical distance may be between about fifty percent (50%) and about ninety percent (90%) of a vertical thickness of the heat shield measured between the cavity and the chamber surfaces.

A cross-sectional area of the outlet may be between about one percent and about fifty percent of an area of an indentation surface, where the indentation surface defines the indentation.

The foregoing features and the operation of the invention will become more apparent in light of the following description and the accompanying drawings.

DETAILED DESCRIPTION OF THE INVENTION

Figure 1:
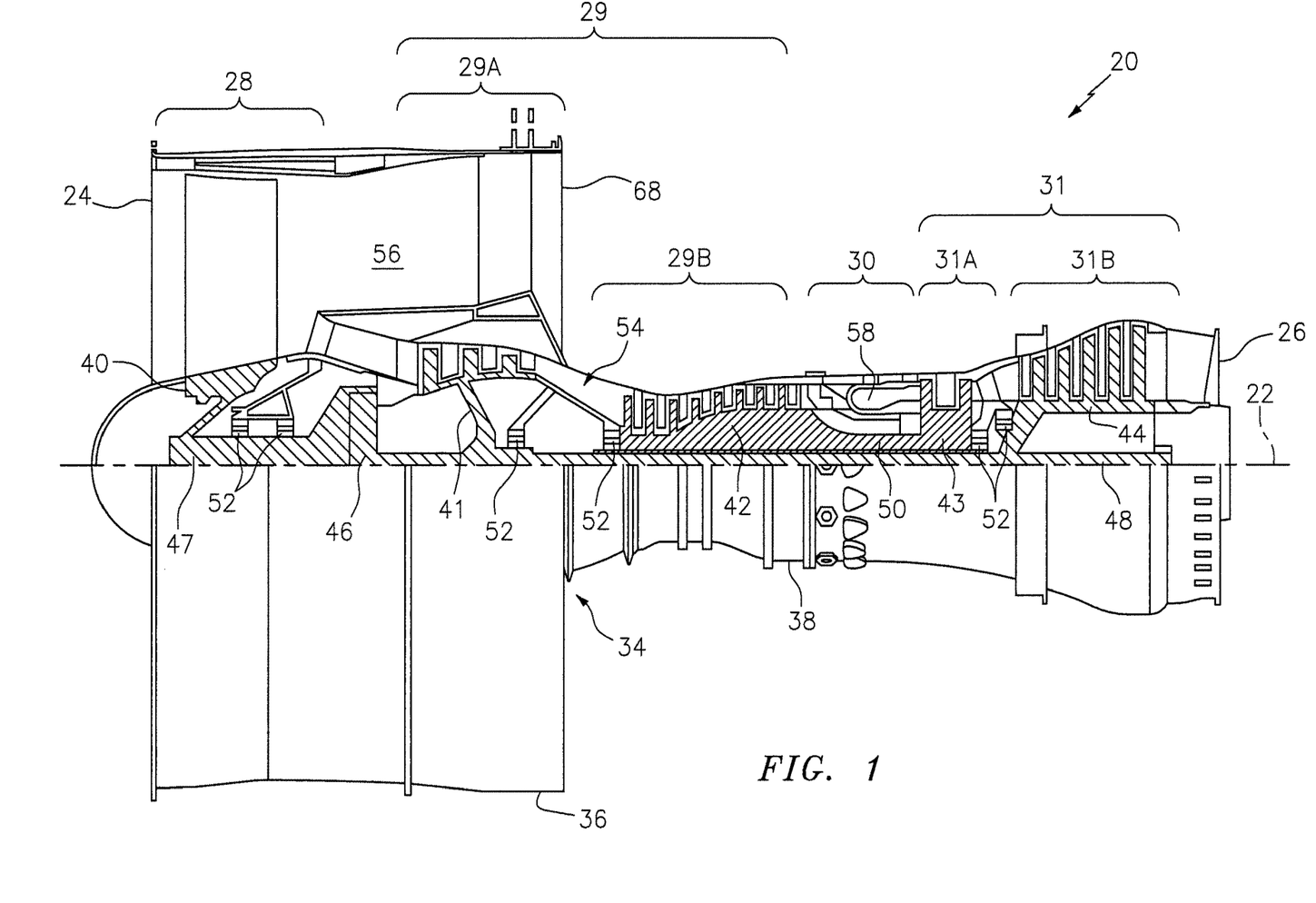
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 and a second engine case 38.

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 (e.g., an epicyclic gear train) through a fan shaft 47. The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52; e.g., rolling element bearings. Each of the bearings 52 is connected to the second engine case 38 by at least one stationary structure such as, for example, an annular support strut.

Air enters the turbine engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the turbine engine 20 through the airflow exhaust 26. Within the combustor section 30, fuel is injected into a combustion chamber 58 and mixed with the core air. This fuel-core air mixture is ignited to power the turbine engine 20 and provide forward engine thrust. The bypass air is directed through the bypass gas path 56 and out of the turbine engine 20 through a bypass nozzle 68 to provide additional forward engine thrust. Alternatively, the bypass air may be directed out of the turbine engine 20 through a thrust reverser to provide reverse engine thrust.

Figure 2:
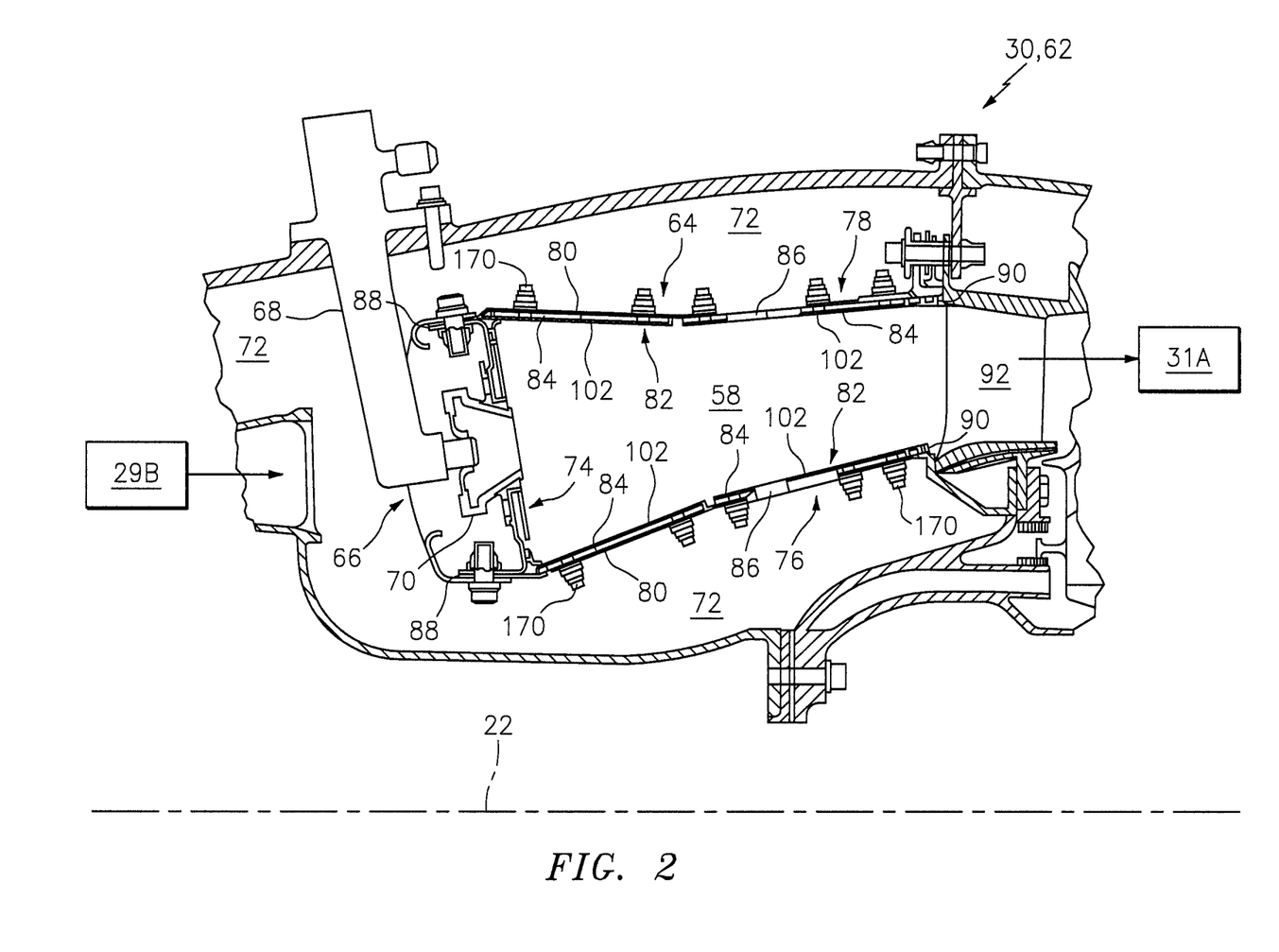
FIG. 2 is a side cutaway illustration of a portion of a combustor section.

FIG. 2 illustrates an assembly 62 of the turbine engine 20. This turbine engine assembly 62 includes a combustor 64. The turbine engine assembly 62 also includes one or more fuel injector assemblies 66, each of which may include a fuel injector 68 mated with a swirler 70.

Figure 3:
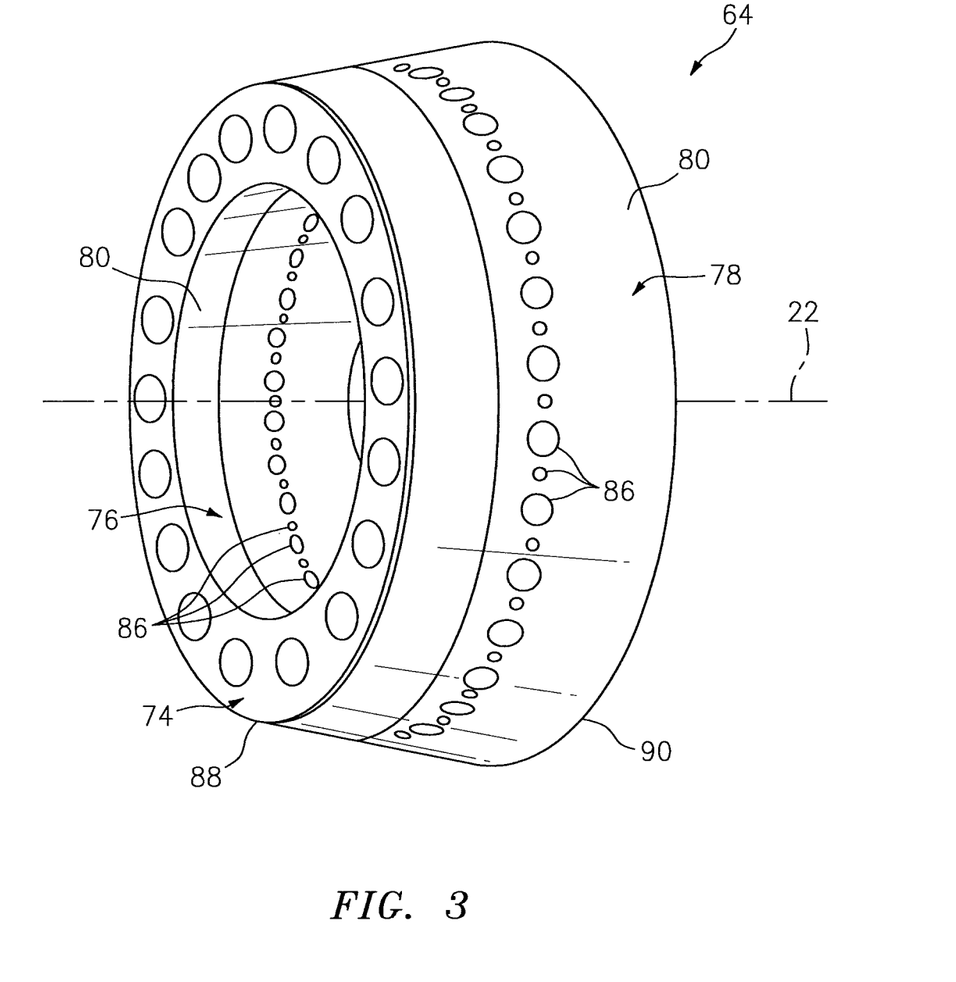
FIG. 3 is a perspective illustration of a portion of a combustor.

The combustor 64 may be configured as an annular floating wall combustor, which may be arranged within an annular plenum 72 of the combustor section 30. The combustor 64 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the turbine section 31A, thereby defining the combustion chamber 58.

Referring to FIG. 2, the inner wall 76 and the outer wall 78 may each have a multi-walled structure; e.g., a dual-walled hollow structure. The inner wall 76 and the outer wall 78 of FIG. 2, for example, each includes a tubular combustor shell 80 and a tubular combustor heat shield 82. The inner wall 76 and the outer wall 78 also each includes one or more cooling cavities 84 (e.g., impingement cavities) and one or more quench apertures 86, which are arranged circumferentially around the centerline 22 (see FIG. 3).

The shell 80 extends circumferentially around the centerline 22. The shell 80 extends axially along the centerline 22 between an upstream end 88 and a downstream end 90. The shell 80 is connected to the bulkhead 74 at the upstream end 88. The shell 80 may be connected to a stator vane assembly 92 or the HPT section 31A at the downstream end 90.

Figure 4:
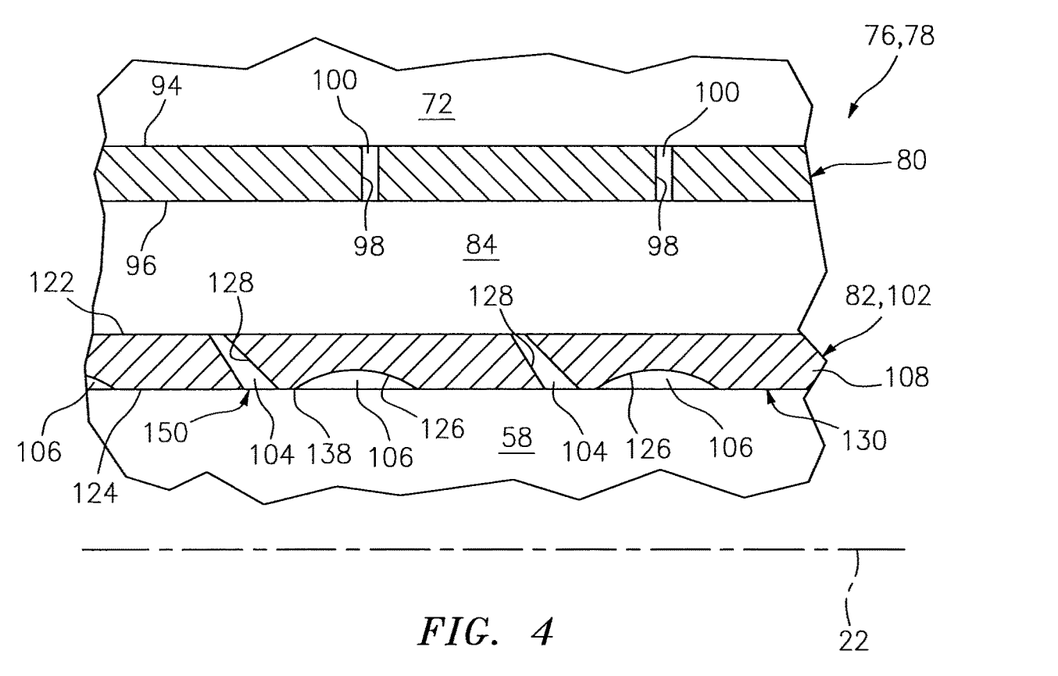
FIG. 4 is a side sectional illustration of a portion of a combustor wall.

Referring to FIG. 4, the shell 80 includes a plenum surface 94, a cavity surface 96 and one or more aperture surfaces 98. The shell 80 extends radially between the plenum surface 94 and the cavity surface 96. The plenum surface 94 defines a portion of the plenum 72 (see also FIG. 2). The cavity surface 96 defines a portion of one or more of the cavities 84.

Each of the aperture surfaces 98 defines a cooling aperture 100. The cooling aperture 100 extends (e.g., radially) through the shell 80 from the plenum surface 94 to the cavity surface 96. Each cooling aperture 100 may be configured as an impingement aperture. Each aperture surface 98 of FIG. 4, for example, is configured to direct a jet of cooling air to impinge substantially perpendicularly against the heat shield 82 as described below in further detail.

Referring to FIG. 2, the heat shield 82 extends circumferentially around the centerline 22. The heat shield 82 extends axially along the centerline 22 between an upstream end and a downstream end. The heat shield 82 may include one or more heat shield panels 102, one or more of which may have an arcuate geometry. These panels 102 may be arranged into one or more panel arrays. The panel arrays are arranged at discrete locations along the centerline 22. The panels 102 in each array are disposed circumferentially around the centerline 22 and form a hoop. Alternatively, the heat shield 82 may be configured from one or more tubular bodies.

Figure 5:
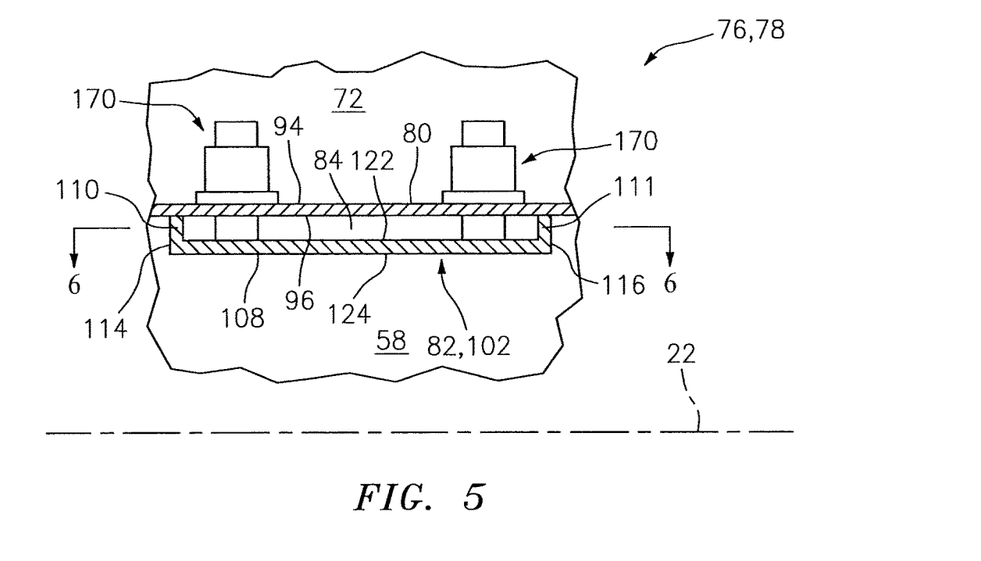
FIG. 5 is a side sectional illustration of another portion of the combustor wall.
Figure 6:
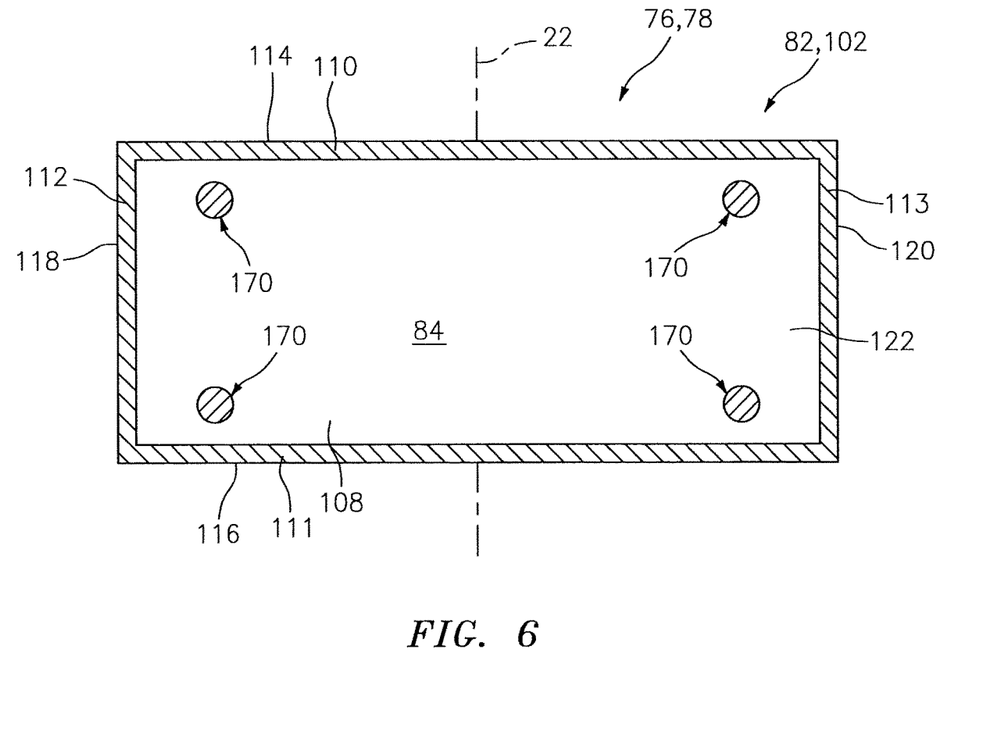
FIG. 6 is a sectional illustration of the combustor wall portion of FIG. 5.

FIGS. 5 and 6 illustrate exemplary portions of one of the walls 76, 78. It should be noted, referring to FIG. 4, that the heat shield 82 includes one or more cooling apertures 104 and one or more indentations 106 as described below in further detail. For ease of illustration, however, the shell 80 and the heat shield 82 of FIGS. 5 and 6 are respectively shown without the cooling apertures 100 and 104 and the indentations 106.

Each of the panels 102 includes a panel base 108 and one or more panel rails (e.g., rails 110-113). The panel base 108 may be configured as a generally curved (e.g., arcuate) plate. The panel base 108 extends axially between an upstream axial end 114 and a downstream axial end 116. The panel base 108 extends circumferentially between opposing circumferential ends 118 and 120.

Referring to FIG. 4, the panel base 108 includes at least one cavity surface 122, a chamber surface 124, one or more indentation surfaces 126, and one or more aperture surfaces 128. The panel base 108 extends radially between the cavity surface 122 and the chamber surface 124. The cavity surface 122 defines a portion of a side of a respective one of the cooling cavities 84. The chamber surface 124 defines a portion of a side of the combustion chamber 58.

Figure 7:
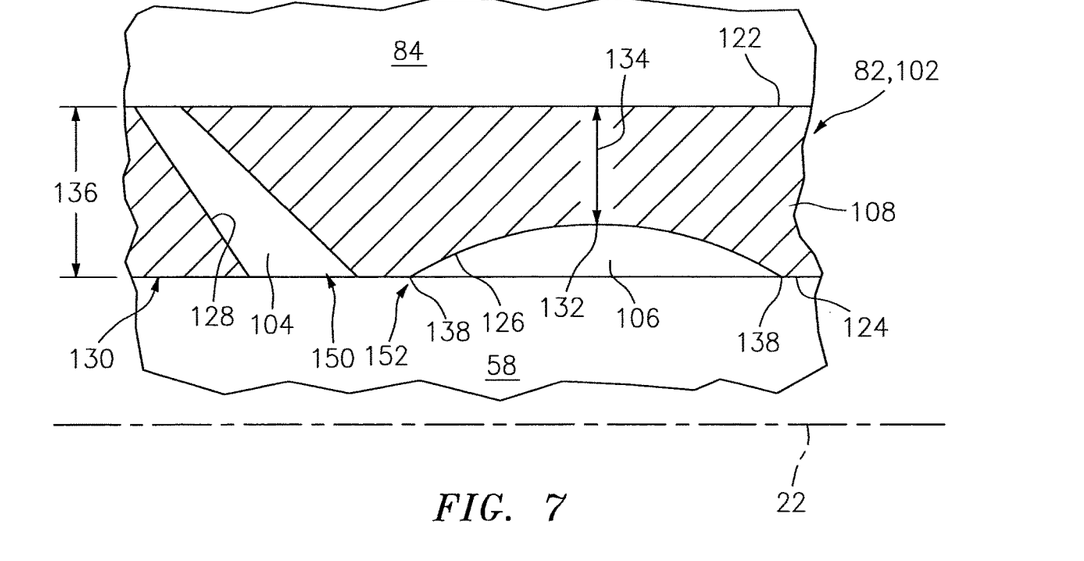
FIG. 7 is a side sectional illustration of a portion of a heat shield.
Figure 8:
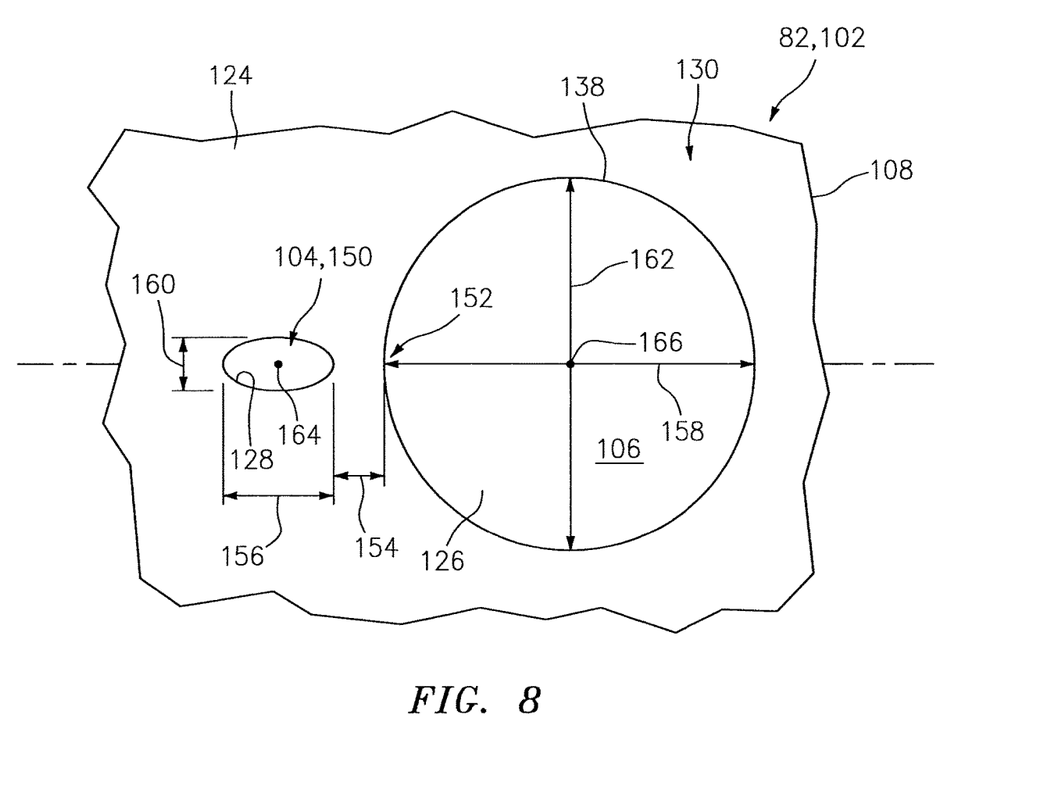
FIG. 8 is an illustration of the heat shield portion of FIG. 7.

Referring to FIGS. 7 and 8, each of the indentation surfaces 126 is located on a side 130 (e.g., a hot side) of the heat shield 82 that faces the combustion chamber 58, and is operatively disposed on an opposite side (e.g., a cold side) of the heat shield 82 opposite surface 122, which faces a respective one of the cooling cavities 84. The indentation surface 126 is thus defined opposite the cooling cavity 84. Each indentation surface 126 may be integrally formed with the chamber surface 124, but is also radially recessed therefrom along a substantial portion thereof as shown. A low point 132 of the indentation surface 126 of FIG. 7, for example, is located a radial distance 134 from the cavity surface 122. This radial distance 134 may be, for example, between about fifty percent (50%) and about ninety percent (90%) or more of a radial thickness 136 of the respective panel 102 as measured, for example, radially between the cavity and the chamber surfaces 122 and 124 proximate the respective indentation surface 126. An edge 138 of the indentation surface 126, however, may be contiguous with the chamber surface 124. In this manner, each indentation surface 126 defines a respective one of the indentations 106 in the side 130 of the heat shield 82.

Figure 9:
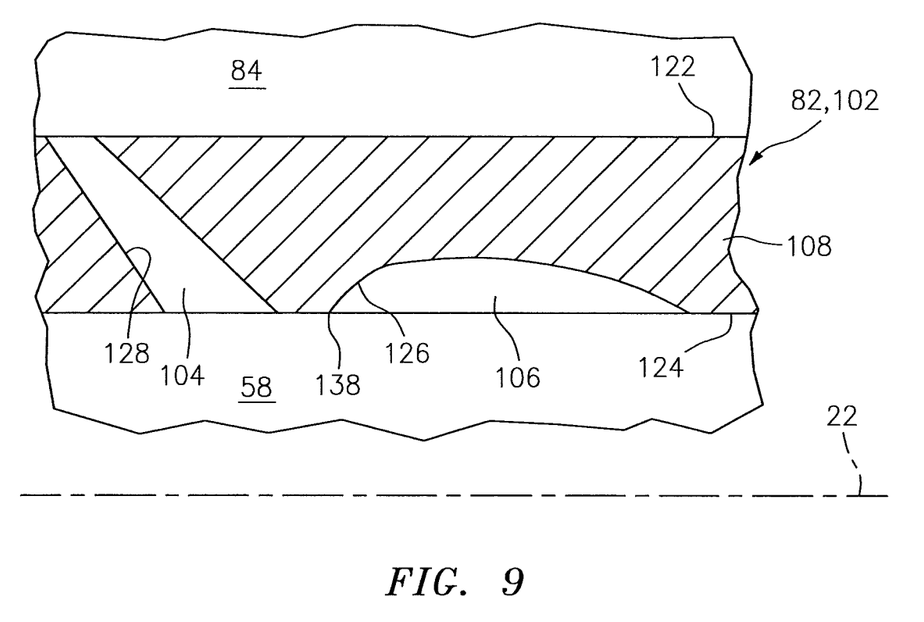
FIGS. 9 and 10 are side sectional illustrations of respective portions of alternate embodiment heat shields.
Figure 10:
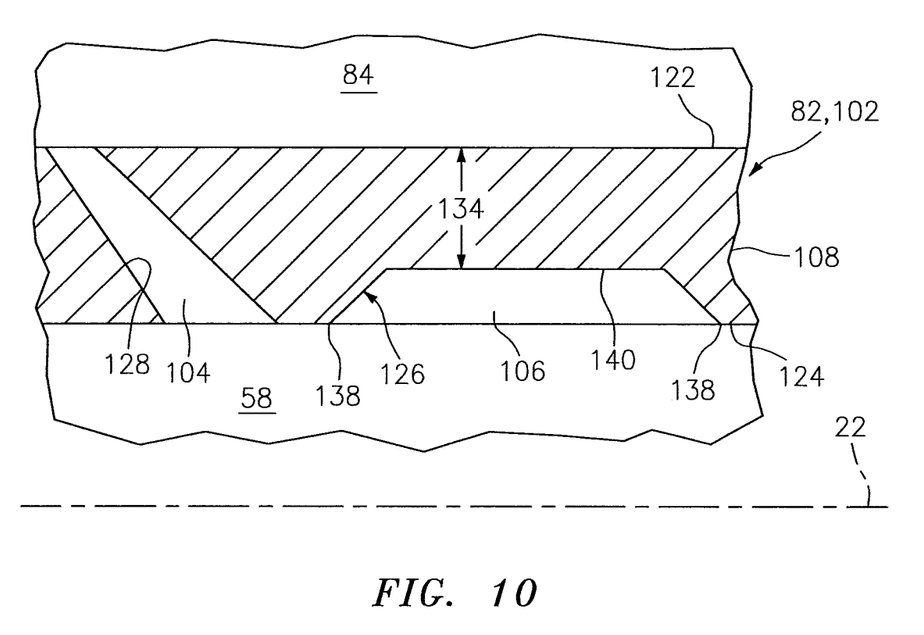
Figure 11:
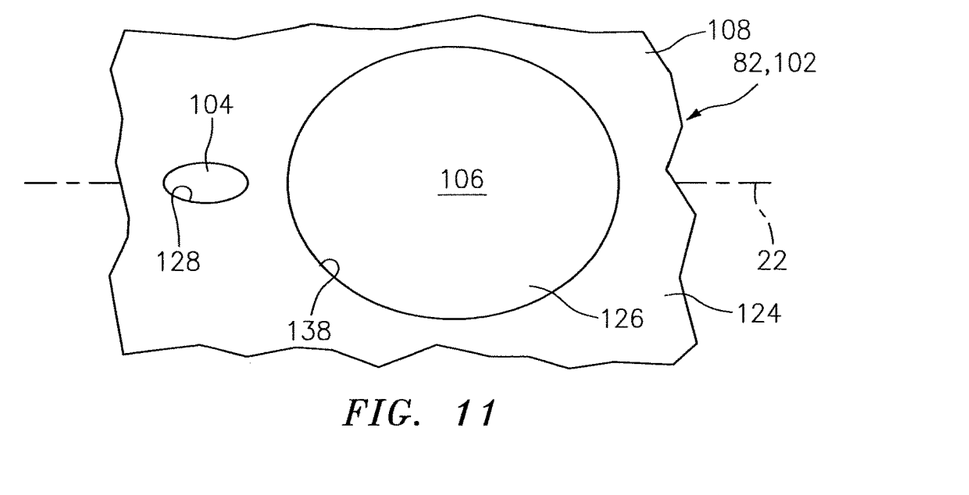
FIG. 11-19 are illustrations of respective portions of alternate embodiment heat shields.
Figure 12:
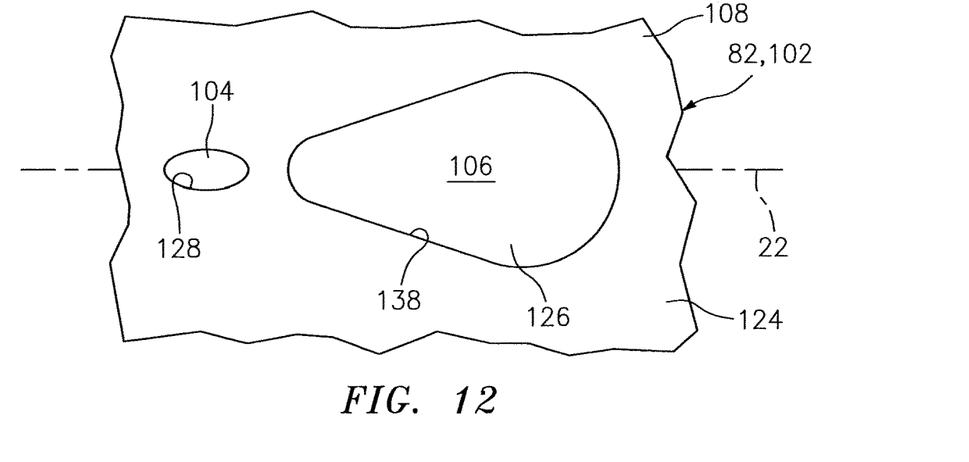
Figure 13:
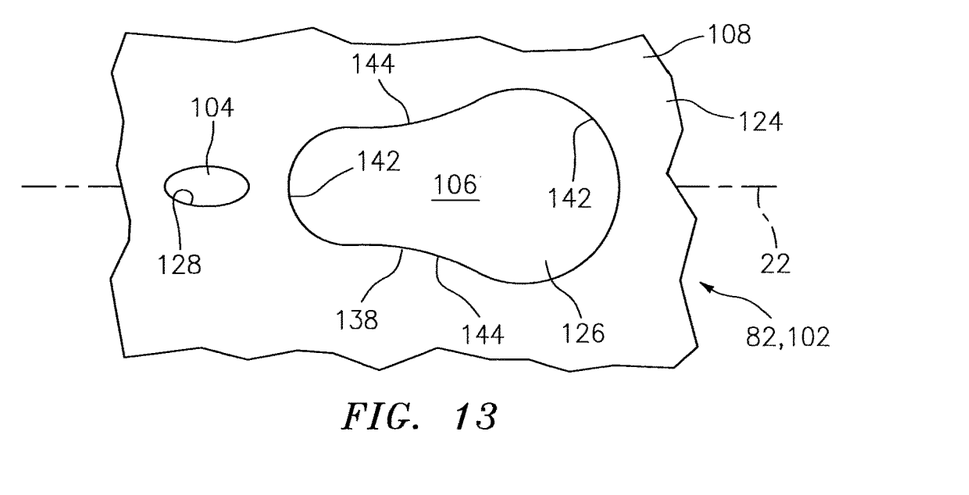

The indentation surface 126 of FIGS. 7 and 8 may have a partial-hemispherical shape with a circular peripheral geometry. The indentation surface 126, for example, has a substantially constant radius. The present invention, however, is not limited to any particular indentation surface configurations. In the embodiment of FIG. 9, for example, the indentation surface 126 has a parti-ellipsoidal shape with a changing radius. In the embodiment of FIG. 10, a central portion 140 of the indentation surface 126 is planar and the radial distance 134 is substantially constant. In the embodiment of FIG. 11, the indentation surface 126 has an elongate (e.g., oval) peripheral geometry. In the embodiment of FIG. 12, the indentation surface 126 has another elongated (e.g., teardrop-shaped) peripheral geometry. In the embodiment of FIG. 13, the indentation surface 126 has still another elongated (e.g., pear-shaped) peripheral geometry with one or more concave sections 142 and one or more convex sections 144. In addition, while the indentation surfaces 126 are described and illustrated above as being located at discrete points in the heat shield 82, some of the indentation surfaces 126 (see FIG. 14) of the panels 102 in at least one of the arrays may form a collective annular indentation surface 146 that extend circumferentially around the centerline 22 and defines an annular indentation 148.

Referring again to FIG. 4, each of the aperture surfaces 128 defines one of the cooling apertures 104 and its respective outlet 150 in the chamber surface 124. Each cooling aperture 104 extends diagonally (e.g., radially as well as axially and/or circumferentially) through the panel base 108 from the cavity surface 122 to the chamber surface 124.

Each cooling aperture 104 may be configured as an effusion aperture. Each aperture surface 128 of FIG. 4, for example, is configured to direct a jet of cooling air out of its outlet 150 such that the cooling air forms a film against a downstream portion of the heat shield 82 as described below in further detail.

To facilitate the formation of the film against the heat shield 82, one or more of the cooling apertures 104 may each be acutely angled relative to the chamber surface 124. A width (e.g., diameter) of one or more of the cooling aperture 104 may also or alternatively each increase as the aperture 104 extends from the cavity surface 122 to the chamber surface 124, which provides the respective cooling aperture 104 with a diverging geometry. With the foregoing configuration, each cooling aperture 104 may direct cooling air into the combustion chamber 58 at a relatively slow velocity and along a trajectory that promotes formation of the film against the heat shield 82 and/or reduces cooling air blow off of the chamber surface 124. The smaller inlet of each cooling aperture 104 may also serve to meter cooling air out of the cooling cavity 84. In addition, the diverging geometry increases the surface area of the aperture surface 128, which may increase cooling of the heat shield 82.

Figure 15:
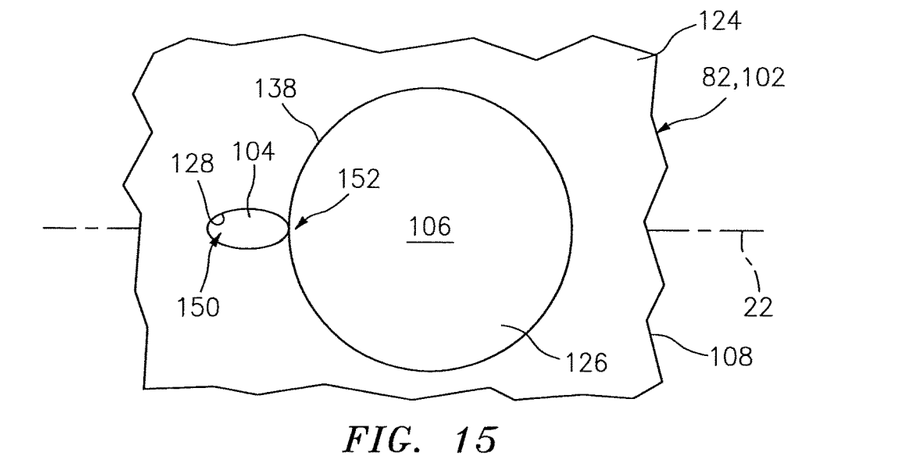
Figure 16:
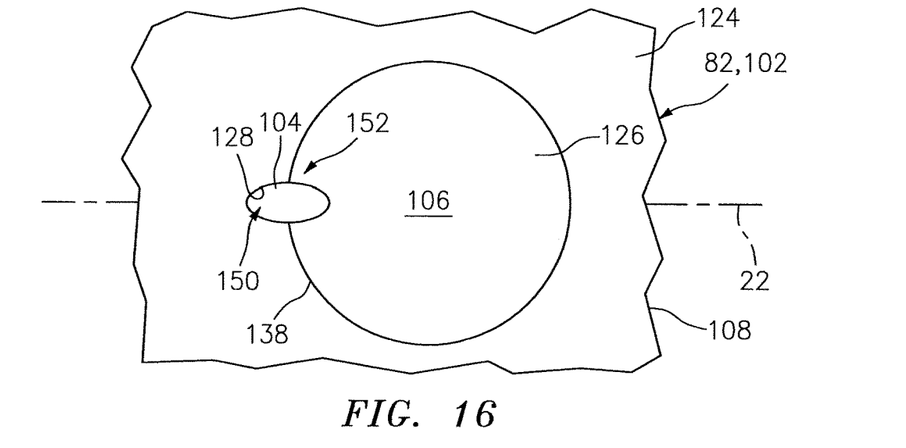
Figure 17:
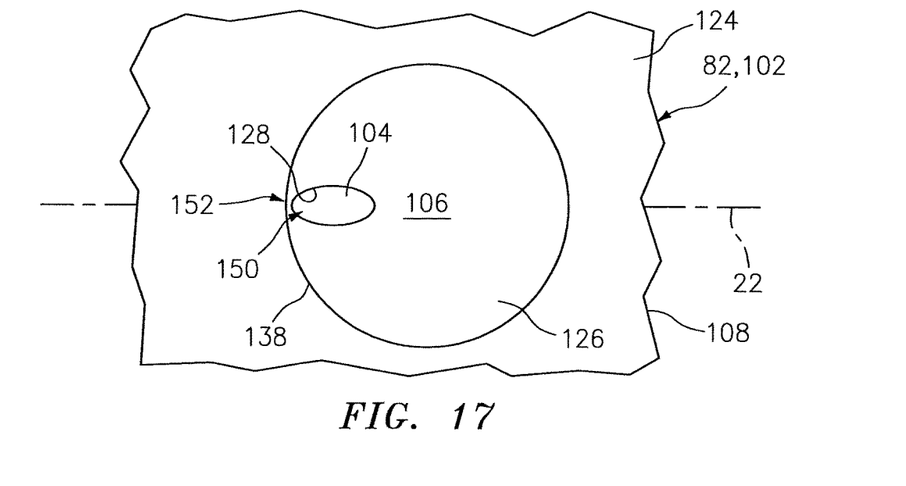

One or more of the aperture surfaces 128 are each configured such that the respective outlet 150 is located generally upstream of and at (e.g., on, adjacent or proximate) the edge 138 of a respective one of the indentation surfaces 126. The outlet 150 of FIGS. 7 and 8 and, more particularly, a downstream portion of the aperture surface 128 defining the outlet 150, for example, is separated from an upstream portion 152 of the edge 138 by an axial (and/or circumferential) distance 154. In another embodiment, the aperture surface 128 defining the outlet 150 of FIG. 15 is adjacent and contiguous with the upstream portion 152 of the edge 138. In another embodiment, the aperture surface 128 defining the outlet 150 of FIG. 16 intersects the upstream portion 152 of the edge 138. In still another embodiment, the aperture surface 128 defining the outlet 150 of FIG. 16 intersects the indentation surface 126 proximate (or adjacent) the upstream portion 152 of the edge 138; e.g., the outlet 150 is within the indentation 106.

Referring again to FIG. 8, the aperture surface 128 may also be configured such that a cross-sectional area of the outlet 150 is less than an area of the respective adjacent indentation surface 126. The cross-sectional area of the outlet 150 of FIG. 8, for example, may be between about one percent (1%) and about fifty percent (50%) of the area of the indentation surface 126. The outlet 150 has a first width 156 (e.g., axial diameter) that may be less than a corresponding width 158 (e.g., axial diameter) of the indentation surface 126, which in turn may be less than a (e.g., axial) distance between adjacent upstream and downstream outlets 150 surrounding the indentation surface 126 (see FIG. 4). The outlet 150 has a second width 160 (e.g., a circumferential diameter) that may be less than a corresponding width 162 (e.g., a circumferential diameter) of the indentation surface 126.

Figure 18:
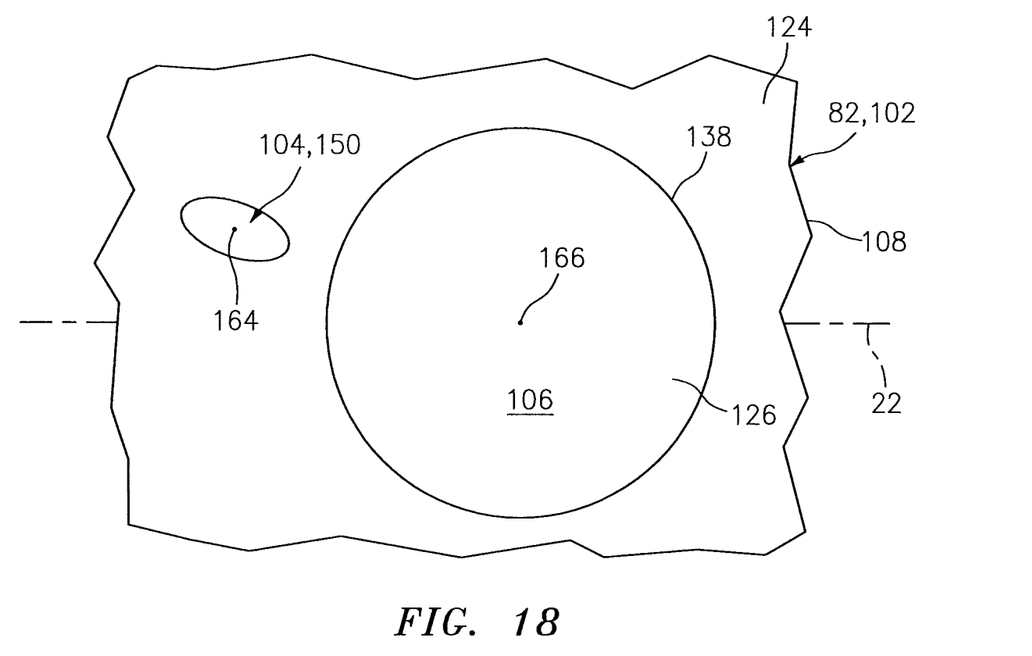
Figure 19:
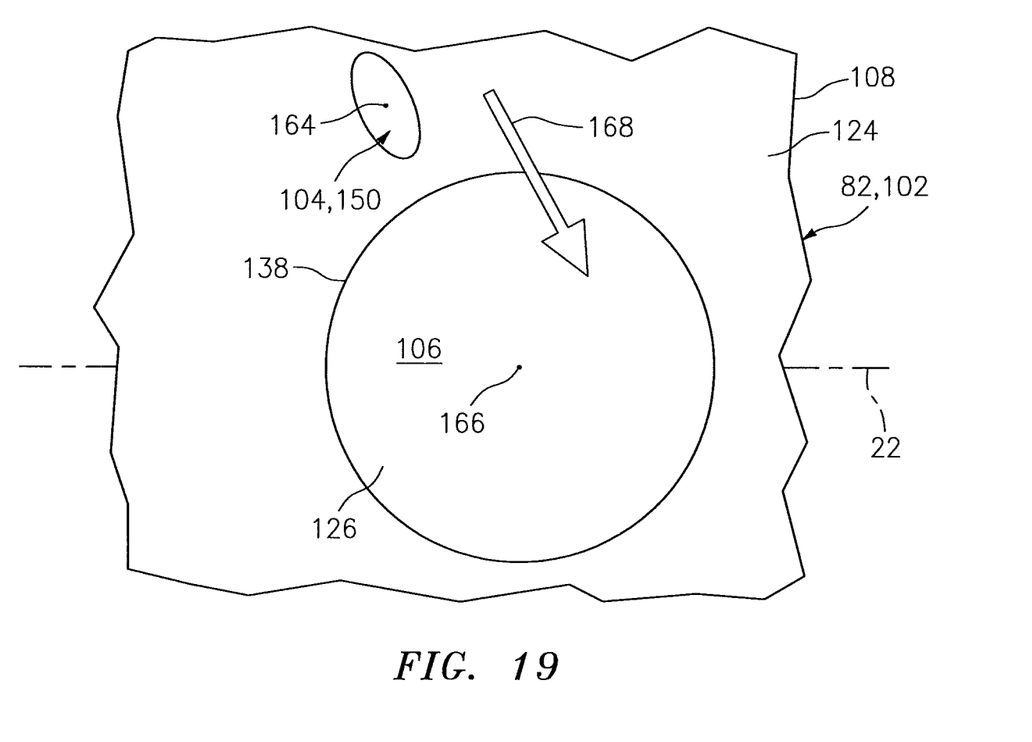

The aperture surface 128 defining the outlet 150 may be aligned with a respective one of the indentation surfaces 126. A centroid 164 of the outlet 150 of FIG. 8, for example, is substantially circumferentially aligned with a centroid 166 of the indentation surface 126 and, thus, the indentation 106. In other embodiments, however, the centroid 164 may be circumferentially offset from the centroid 166 by a distance as illustrated in FIG. 18. In still other embodiments, the centroid 164 and/or the aperture surface 128 may be circumferentially offset from the centroid 166 and/or the entire indentation surface 126 by a distance as illustrated in FIG. 19. The outlet 150, however, may still be located generally upstream of the indentation 106. For example, local air flow adjacent the indentation surface 126 and/or cooling air directed out of the outlet 150 may move generally circumferentially along a trajectory indicated by arrow 168 during engine operation.

Referring to FIGS. 5 and 6, the panel rails may include one or more circumferentially extending end rails 110 and 111 and one more axially extending end rails 112 and 113. Each of the foregoing rails 110-113 of the inner wall 76 extends radially in from the respective panel base 108; see also FIG. 2. Each of the rails 110-113 of the outer wall 78 extends radially out from the respective panel base 108; see also FIG. 2. The rail 110 is arranged at the axial end 114. The rail 111 is arranged at the axial end 116. The rails 112 and 113 extend axially between and are connected to the rails 110 and 111. The rail 112 is arranged at the circumferential end 118. The rail 113 is arranged at the circumferential end 120.

Referring to FIG. 2, the heat shield 82 of the inner wall 76 circumscribes the shell 80 of the inner wall 76, and defines an inner side of the combustion chamber 58. The heat shield 82 of the outer wall 78 is arranged radially within the shell 80 of the outer wall 78, and defines an outer side of the combustion chamber 58 that is opposite the inner side. The heat shield 82 and, more particularly, each of the panels 102 may be respectively attached to the shell 80 by a plurality of mechanical attachments 170 (e.g., threaded studs respectively mated with washers and nuts); see also FIG. 5. The shell 80 and the heat shield 82 thereby respectively form the cooling cavities 84 in each of the walls 76, 78.

Referring to FIGS. 5 and 6, each of the cooling cavities 84 is defined radially by and extends radially between the cavity surface 96 and a respective one of the cavities surfaces 122 as set forth above. Each cooling cavity 84 may be defined circumferentially by and extend circumferentially between the rails 112 and 113 of a respective one of the panels 102. Each cooling cavity 84 may be defined axially by and extend axially between the rails 110 and 111 of a respective one of the panels 102. In this manner, referring to FIG. 4, each cooling cavity 84 may fluidly couple one or more of the cooling apertures 100 with one or more of the cooling apertures 104.

Still referring to FIG. 4, during turbine engine operation, core air from the plenum 72 is directed into each of the cooling cavities 84 through respective cooling apertures 100. This core air (e.g., cooling air) may impinge against the panel base 108, thereby impingement cooling the heat shield 82. The cooling air within each cooling cavity 84 is subsequently directed through respective cooling apertures 104 and into the combustion chamber 58, thereby film cooling a downstream portion of the heat shield 82 as described below in further detail. Within each cooling aperture 104, the cooling air may also cool the heat shield 82 through convective heat transfer.

Figure 20:
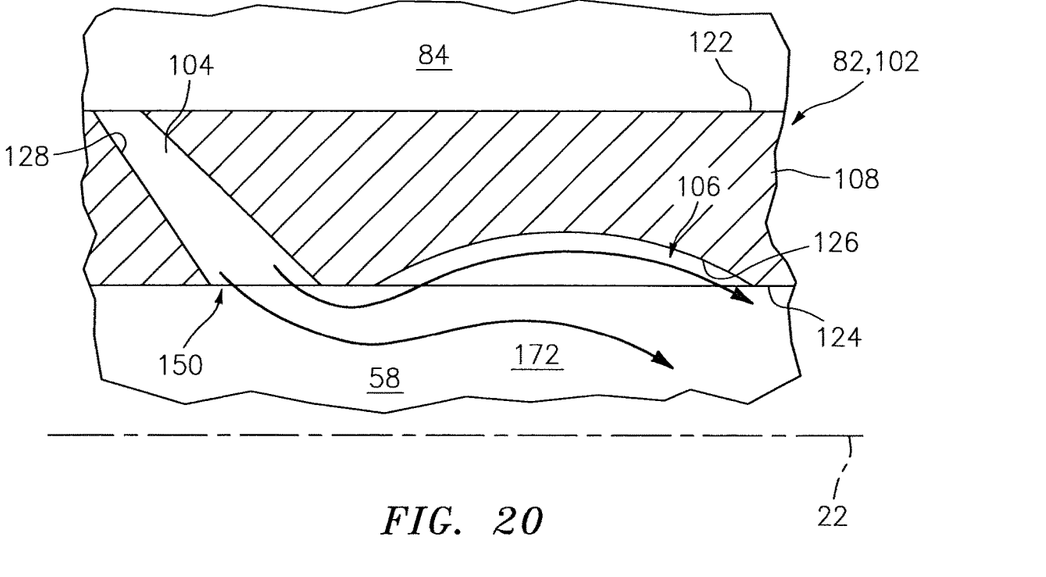
FIG. 20 is a side sectional illustration of the combustor wall portion of FIG. 7 during turbine engine operation.
Figure 21:
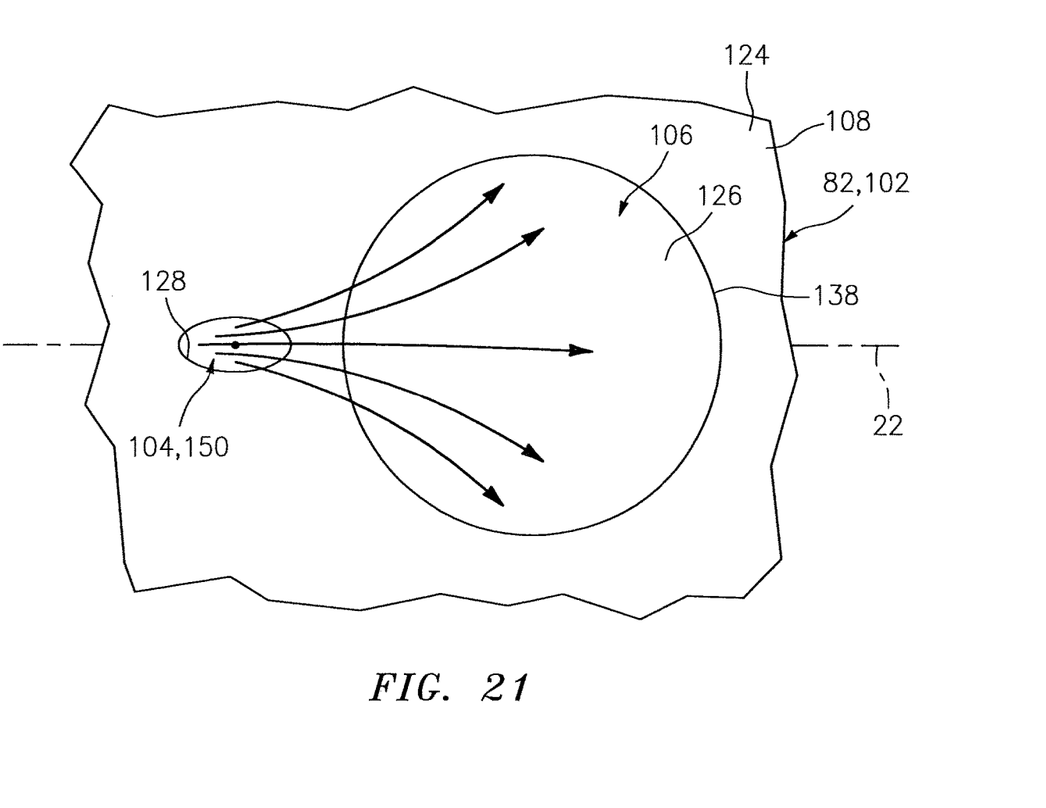
FIG. 21 is a sectional illustration of the combustor wall portion of FIG. 8 during turbine engine operation.

The aperture surface 128 of FIGS. 20 and 21 may direct the cooling air out of the outlet 150 to provide a film of cooling air against the chamber surface 124 and the indentation surface 126. Since the indentation surface 126 is recessed in from the chamber surface 124, a fluid suction force may be generated that pulls the cooling air film into the indentation 106 and/or radially towards the indentation surface 126; e.g., pressure within the indentation 106 may be less than that within an adjacent region 172 of the combustion chamber 58. In this manner, the cooling air film may remain "attached" to the heat shield 82 (e.g., the indentation surface 126 and the chamber surface 124) for a relatively long distance. In addition, shear force between the cooling air film and the core air flowing through the combustion chamber 58 may induce vortices within the cooling air film. These vortices may cause some or all of the cooling air film to circulate and/or re-circulate against the side 130 of the heat shield 82; e.g., within the indentation 106. Such cooling air circulation may increase the thermal boundary layer between the relatively hot core gas and the heat shield 82, thereby further reducing the temperature of the heat shield 82.

Figure 14:
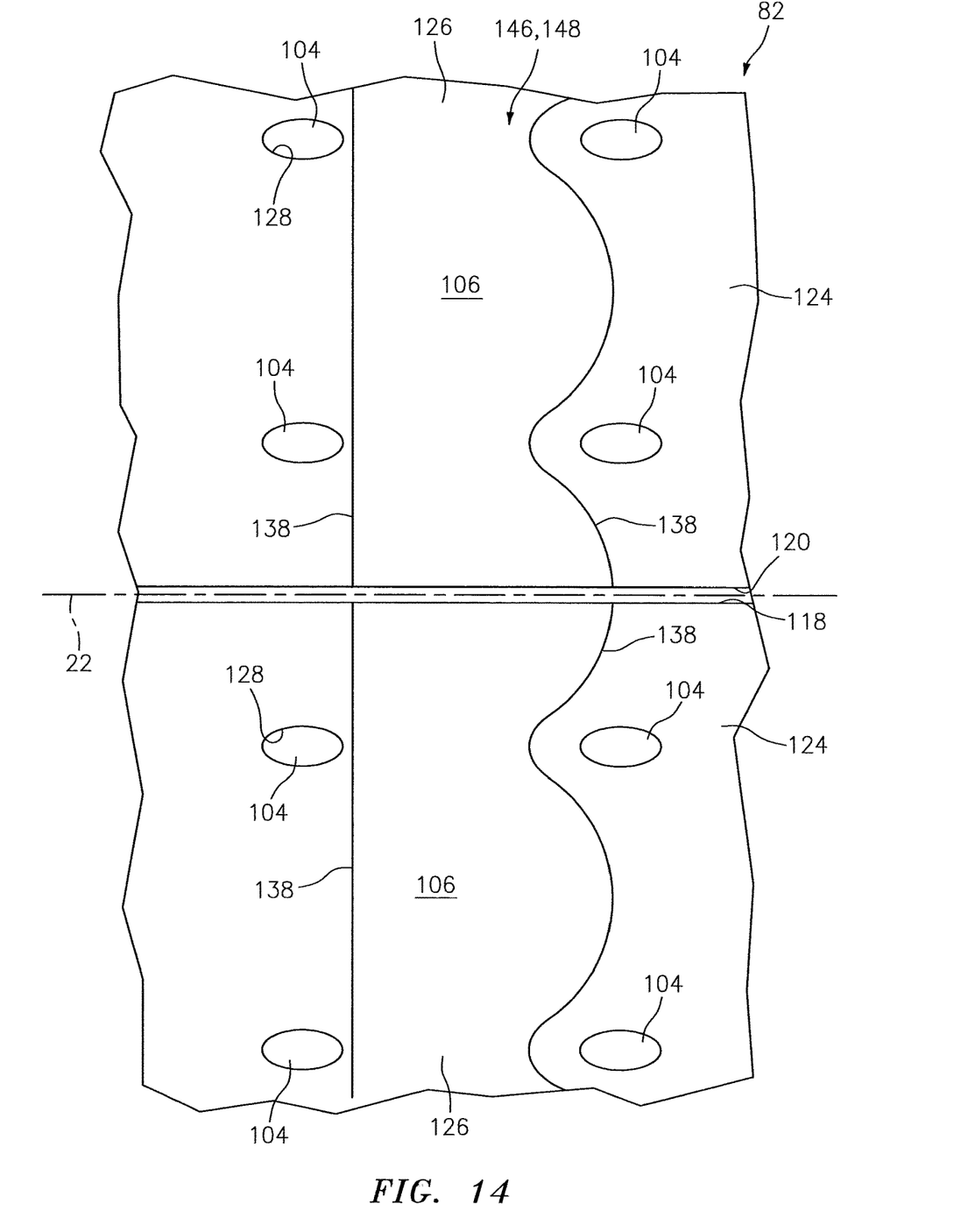
Figure 22:
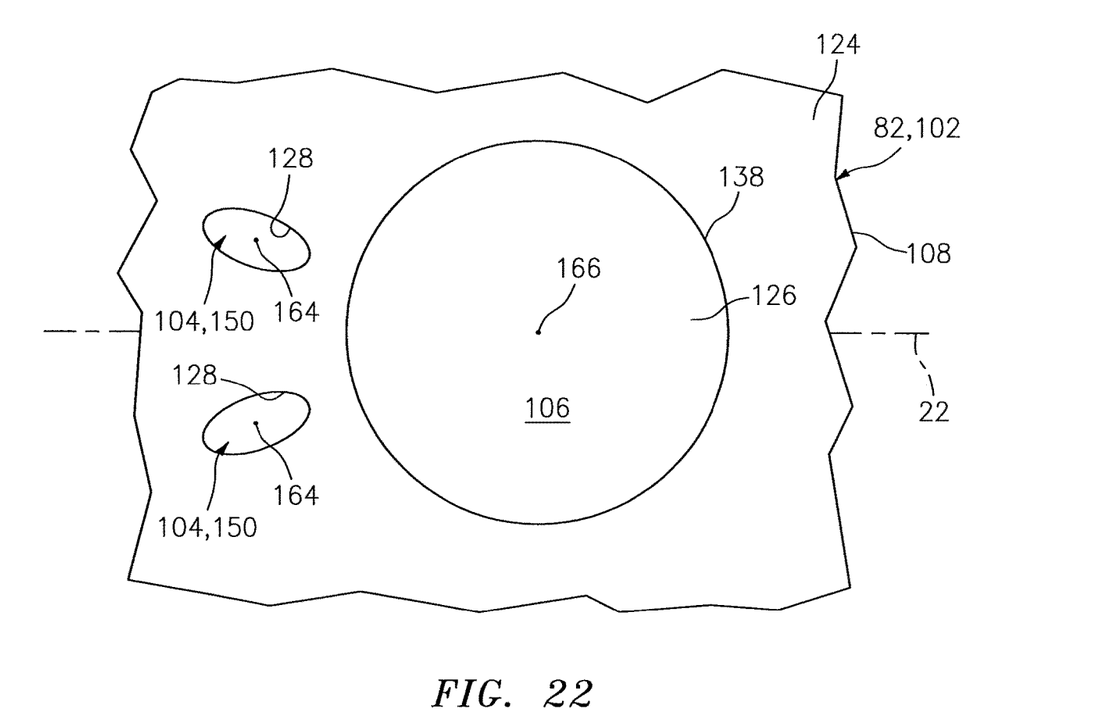
FIG. 22 is an illustration of an alternate embodiment heat shield.

Referring to FIG. 22, in some embodiments, a plurality of the aperture surfaces 128 may be configured to direct cooling air towards a common one of the indentation surfaces 126; see also FIG. 14. The aperture surfaces 128 of FIG. 22, for example, are configured such that the respective outlets 150 are located proximate the edge 138 of the indentation surface 126. In this manner, a density of the cooling apertures 104 may be increased to increase film cooling of the heat shield 82.

In some embodiments, the bulkhead 74 may also or alternatively be configured with a multi-walled structure (e.g., a hollow dual-walled structure) similar to that described above with respect to the inner wall 76 and the outer wall 78. The bulkhead 74, for example, may include a shell and a heat shield with one or more indentations as described above with respect to the heat shield 82. Similarly, other components (e.g., a gaspath wall) within the turbine engine 20 may include a multi-walled structure as described above.

The terms "upstream", "downstream", "inner", "outer", "radial", circumferential" and "axial" are used to orientate the components of the turbine engine assembly 62 and the combustor 64 described above relative to the turbine engine 20 and its centerline 22. A person of skill in the art will recognize, however, one or more of these components may be utilized in other orientations than those described above. The present invention therefore is not limited to any particular spatial orientations.

The turbine engine assembly 62 may be included in various turbine engines other than the one described above. The turbine engine assembly 62, for example, may be included in a geared turbine engine where a gear train connects one or more shafts to one or more rotors in a fan section, a compressor section and/or any other engine section. Alternatively, the turbine engine assembly 62 may be included in a turbine engine configured without a gear train. The turbine engine assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
a shell and a heat shield with a cooling cavity between the shell and the heat shield,
the heat shield defining a plurality of cooling apertures and an indentation in a side of the heat shield opposite the cooling cavity,
wherein the plurality of cooling apertures are fluidly coupled with the cooling cavity,
wherein the indentation is configured such that cooling air directed out of the cooling cavity from a first of the plurality of cooling apertures at least partially circulates against the side of the heat shield, and
wherein the heat shield comprises a surface that defines the indentation with a circular peripheral geometry.

2. The assembly of claim 1, wherein
the plurality of cooling apertures in the heat shield are effusion apertures; and
the shell defines a plurality of impingement apertures that are fluidly coupled with the effusion apertures by the cooling cavity.

3. The assembly of claim 1, wherein the heat shield includes a first surface and a second surface with the first surface defining an outlet of the first of the plurality of cooling apertures and the second surface defining the indentation, and wherein the first and second surfaces are adjacent and contiguous with one another.

4. The assembly of claim 1, wherein the first of the plurality of cooling apertures has an outlet that is separated by a distance from the indentation.

5. The assembly of claim 1, wherein the first of the plurality of cooling apertures has an outlet that intersects the indentation.

6. The assembly of claim 1, wherein the first of the plurality of cooling apertures is circumferentially aligned with the indentation.

7. The assembly of claim 1, wherein the first of the plurality of cooling apertures is circumferentially offset from the indentation.

8. The assembly of claim 1, wherein a second of the plurality of cooling apertures is configured to direct cooling air away from the cooling cavity, and the indentation is further configured such that cooling air directed from the second of the plurality of cooling apertures at least partially circulates against the side of the heat shield.

9. The assembly of claim 1, wherein
the heat shield further defines a second indentation in the side of the heat shield, and
the second indentation is configured such that cooling air directed from a second of the plurality of cooling apertures at least partially circulates against the side of the heat shield.

10. The assembly of claim 1, wherein the heat shield includes an arcuate panel in which the first of the plurality of cooling apertures and the indentation are defined.

11. The assembly of claim 1, further comprising a tubular combustor wall that includes the shell and the heat shield, and the heat shield configured to form a peripheral boundary of a combustion chamber.

12. An assembly for a turbine engine, the assembly comprising:
a shell; and
a heat shield attached to the shell with a cooling cavity extending between the heat shield and the shell, the heat shield defining a plurality of cooling apertures and an indentation in a side of the heat shield opposite the cooling cavity,
wherein the plurality of cooling apertures are fluidly coupled with the cooling cavity, and an outlet of a first of the plurality of cooling apertures is located on an edge of the indentation, and
wherein the indentation is configured such that cooling air directed out of the cooling cavity from the outlet at least partially circulates against the side of the heat shield.

13. The assembly of claim 12, wherein
the heat shield extends between a chamber surface and a cavity surface that defines a portion of the cooling cavity;
a point of an indentation surface that defines the indentation is located a distance from the cavity surface; and
the distance is between fifty percent and ninety percent of a thickness of the heat shield measured between the cavity and the chamber surfaces.

14. The assembly of claim 12, wherein a cross-sectional area of the outlet is between one percent and fifty percent of an area of an indentation surface that defines the indentation.

15. The assembly of claim 12, wherein
the plurality of cooling apertures in the heat shield are effusion apertures; and
the shell defines a plurality of impingement apertures that are fluidly coupled with the effusion apertures by the cooling cavity.

16. An assembly for a turbine engine, the assembly comprising:
a shell and a heat shield with a cooling cavity between the shell and the heat shield;
the heat shield configured with a plurality of cooling apertures and a plurality of indentations in a side of the heat shield opposite the cooling cavity;
the plurality of indentations comprising a first indentation and a second indentation located downstream of the first indentation;
the plurality of cooling apertures fluidly coupled with the cooling cavity;
the first indentation configured such that cooling air directed out of the cooling cavity from a first of the plurality of cooling apertures at least partially circulates in the first indentation against the side of the heat shield; and
the second indentation configured such that cooling air directed out of the cooling cavity from a second of the plurality of cooling apertures at least partially circulates in the second indentation against the side of the heat shield downstream of the first indentation.

17. The assembly of claim 16, further comprising a surface that defines the indentation with an oval peripheral geometry.

18. The assembly of claim 16, further comprising a surface that defines the indentation, wherein the indentation has a peripheral geometry with one or more concave sections and one or more convex sections.

19. The assembly of claim 16, wherein an annular surface of the heat shield defines the indentation.

* * * * *